3,085,910
POLYVINYL CHLORAL, METHODS OF MAKING THE SAME, AND USES THEREOF
Fred H. Sexsmith, Highland Park, N.J., assignor, by mesne assignments, to Johnson & Johnson, New Brunswick, N.J., a corporation of New Jersey
Filed Apr. 20, 1959, Ser. No. 807,593
6 Claims. (Cl. 117—138.8)

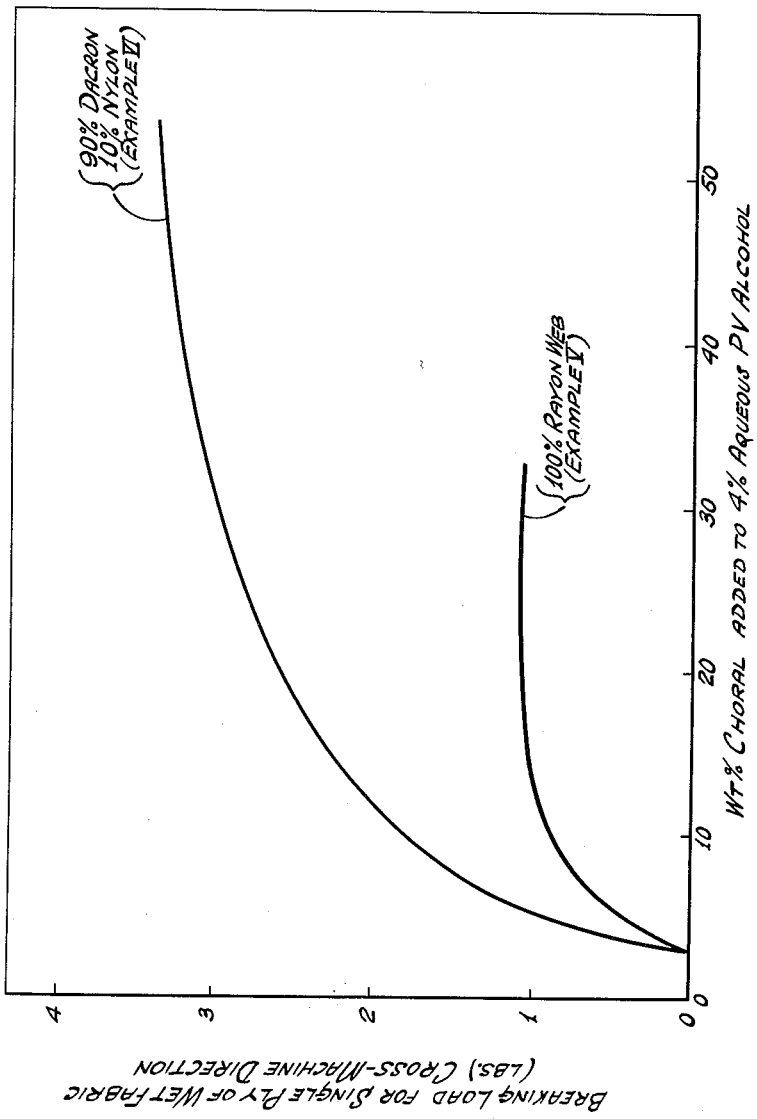

The present invention relates to novel chemical compounds, to methods of making such compounds, and to uses of the same. More particularly, the present invention is concerned with reaction products of polyvinyl alcohol and chloral, to chemical processes for obtaining such reaction products, and to uses of the resulting reaction products as adhesives, binders, coatings, emulsions, sizes and the like in the textile, leather, paper and related industries, or as shaped or molded products, such as films, filaments, bristles, ribbons, tapes, plastics, etc., in the commercial arts.

Polyvinyl alcohol resins are normally produced by the hydrolysis of polyvinyl acetate in an alcohol solution, using alkaline or acid catalysts. The resulting resins have many uses; for example, they may be formed into smooth, clear, tough films which have excellent tear resistance, tensile strength, abrasion resistance, hardness, flexibility and elongation. The resistance of these films to organic solvents, oils and greases is good. Unfortunately, however, the resistance to water, weathering, or high humidity conditions is poor and, as a consequence, the uses of the products have been limited to some extent.

Considerable time and effort have been expended to improve the water resistance of polyvinyl alcohol resins, the most common methods being condensations of the polyvinyl alcohol with aldehydes such as formaldehyde, acetaldehyde or butyraldehyde, in the presence of moderate heat and a suitable acid catalyst. The resulting condensation products have increased water resistance but the improvement has not been sufficient in all instances and room for further improvement still exists.

It has now been discovered that an improved, water-insoluble, modified polyvinyl alcohol resin may be prepared by reaction of polyvinyl alcohol with chloral. The resulting product is an in insolubilized, cross-linked polyvinyl chloral resin which possesses good resistance to water and to high humidity conditions, without any loss in the desirable properties and characteristics of polyvinyl alcohol resins as regards tear resistance, tensile strength, abrasion resistance, hardness, flexibility and elongation.

Chloral ($CCl_3CHO$) is available as a colorless liquid having a boiling point of about 98° C. It is very soluble in water and chloroform and is soluble in all proportions in alcohol and ether. Although often classified as an aldehyde, chloral demonstrates many properties not possessed by ordinary aldehydes. For example, chloral combines exothermically with water to form a stable crystalline hydrate containing two hydroxyl groups $$(CCl_3CH(OH)_2)$$

The fact that the water has actually added to the carbonyl group is established by the fact that the resulting chloral hydrate does not give the Schiff red coloration test for aldehydes.

The unusual activity of the carbonyl group in chloral is further demonstrated by the formation of addition products with ammonia and hydroxylamine. These and other similar effects are due apparently to the modifying influence of the three α-chloro atoms on the additive power of the carbonyl group. The effects are believed ascribable to the electronegativity, or electron-attracting character of the three chlorine atoms; the withdrawal of electrons from the carbon atom of the carbonyl group rendering that center relatively electropositive and hence vulnerable to attack by hydroxide ion.

The term chloral, as used herein, is intended to cover chloral and chloral hydrate either individually, or as mixtures in various proportions. The term, technical chloral, as used herein, indicates a composition having a content of 96% (average) chloral with a specific gravity of 1.5 at 25°/4° C.

The chloral may be reacted with the polyvinyl alcohol full strength, or it may be reacted in diluted form, such as in an aqueous solution having any desired concentration. In such an aqueous solution, it is to be appreciated that a part or all of the chloral is present as chloral hydrate.

Polyvinyl alcohol $(—CH_2—CHOH—)_x$ is available as a white to light straw granular powder having a specific gravity of 1.19 to 1.27 and a bulk density of 30 to 40 pounds per cubic foot. Highly hydrolyzed grades are normally difficultly soluble or insoluble in cold water but are usually soluble in hot water about 85° C. and remain dissolved even after cooling. Low viscosity grades (up) to 4 centipoises) having a percentage hydrolysis below 80 dissolve rapidly in water at room temperature.

The polyvinyl alcohol employed within the principles of the present inventive concept has a percent hydrolysis of at least about 73 and a corresponding saponification number of about 273.5. Preferably, the percent hydrolysis is at least about 87 with a corresponding saponification number of about 147.3.

The polyvinyl alcohol may be reacted with the chloral in powdered form, such as by being added to aqueous chloral. Preferably, however, it is reacted in very dilute aqueous form in concentrations less than 5% or 15% by weight. The viscosity of a 4% aqueous solution of polyvinyl alcohol at 20° C. determined by the Hoeppler falling ball method, may be high (35 to 65 centipoises), medium (below 35 and down to 21 centipoises), or low (below 21 and down to 1.3 but preferably down only to 4 centipoises). The pH of a 4% aqueous solution should be in the range of from about 6 to about 8.

The initial reaction between the polyvinyl alcohol and the chloral takes place under surprisingly low activation energy, due most likely to the unusual activity of chloral. Catalysts are not necessary and the reaction preferably takes place at room temperature under normal atmospheric pressure. If desired, however, temperatures may be elevated and pressures may be varied accordingly. Such, however, is not normally necessary.

The initial reaction is essentially a hemi-acetal formation, as follows:

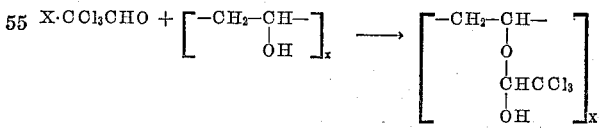

Upon heating to curing temperatures above 100° C. to volatilize and remove the aqueous medium, the reaction continues and yields the following cross-linked reaction product:

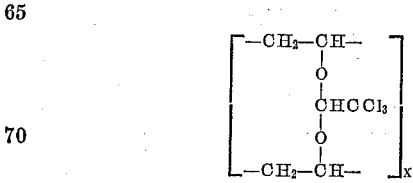

The formation of internal acetals is, however, also present and yields the following reaction product:

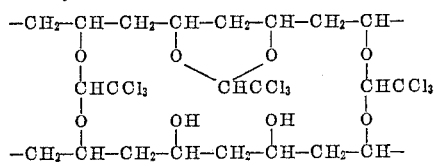

Mixtures in various proportions of full cross-linked acetals and internal acetals are normally obtained.

The ratio of the amounts by weight of the chloral and polyvinyl alcohol in the reaction mixture may be varied widely depending upon the particular properties and characteristics desired in the ultimate reaction product. Theoretical stoichiometrical amounts are 73.7 parts by weight of chloral per 44 parts by weight of polyvinyl alcohol, or a ratio of 1.68 to 1. Lower ratios of chloral to polyvinyl alcohol, say, down to 1:1 or less, may be used. Normally, however, higher ratios up to 3:1 or 4:1 are preferred. On occasion, when it is desired to have a considerable excess of chloral present for a special purpose (such as in autogenic bonding and coating of synthetic fibrous materials), ratios up to 5:1 or higher may be used.

The effect of varying the proportions of the reactants is illustrated in the drawing wherein the FIGURE is a graph of the breaking load in pounds for treated fabrics as plotted against the weight percent of chloral which is added to the aqueous polyvinyl alcohol.

The polyvinyl chloral is obtainable by simply bringing the reactants together, preferably in aqueous solution. Hemi-acetal reaction takes place substantially immediately. The reaction product need not be separated or isolated but may be applied directly to a desired substrate or formed into a shape or molded article of manufacture and cured in situ. The aqueous medium may be removed by a simple heating and drying in an oven, for example. Curing takes place at elevated temperatures of from about 100° C. to about 180° C. for a period of from but a few seconds to several minutes, depending upon the rapidity with which the aqueous medium is removed. Lower temperatures of from about 100° C. to about 130° C. are preferred to avoid damage to the base structure.

Fibrous structures are the preferred substrates for deposition of the polyvinyl chloral, specific examples being woven, knitted, felted or nonwoven fabrics, leather, paper, wood, and like products.

The type of fiber or filament which is used in the fabrication of the fibrous structures is of some importance insofar as the properties and characteristics of the final product are concerned. Where the fiber or filament is capable of being rendered tacky or fusible, or of being dissolved by chloral, a "double-barreled" effect is noted in (1) the coating effect obtained by the polyvinyl chloral and (2) the "bite" of the coating on the fibrous structure which is enhanced by the solvent or tackifying effect of the chloral. Fibers and filaments which are so affected are polyesters, such as polyethylene terephthalene, sold under the registered trademarks "Dacron" and "Kodel"; the polyamides such as nylon 66 (diamine-diacid type) and nylon 6 (polycaprolactam type); the vinyls, including the acrylics and modacrylics, such as "Acrilan," "Orlon," "Dynel," "Verel" and "Vinyon"; the cellulose esters such as cellulose acetate and cellulose triacetate; etc.

Where the fiber or filament is not affected by chloral, the "bite" is less and the effect is essentially "single-barreled." Illustrative of such unaffected fibers are natural fibers, notably cotton and wood pulp, and synthetic fibers, notably regenerated cellulose, polypropylene; etc.

The amount of the polyvinyl chloral which is deposited may vary within very wide limits, depending primarily upon the properties and characteristics desired in the final product. Under normal circumstances, from about 5% to about 25% by weight may be deposited by means of one or a plurality of passes of the material being treated through the coating bath. Where circumstances dictate otherwise, amounts as low as 1% by weight to as high as 70% by weight add-on may be applied. Normally the amount added on will be less for materials which are affected by chloral and will be more for materials which are not affected by chloral.

Non-fibrous structures such as glass, ceramics, plastics, metals, and the like may also be coated. The effects on such non-fibrous structures may also be "double-barreled" or "single-barreled" depending on their chemical nature and the effect of chloral thereon. Various shaped or molded products may also be formed by spinning, extruding, or casting methods. Illustrative of such products are films, filaments, bristles, ribbons, tapes, pellicles, etc.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

Polyvinyl chloral is prepared as follows: the materials used are: (1) 200 milliliters of 4% aqueous polyvinyl alcohol having a percent hydrolysis of at least 99 and a corresponding saponification number of less than 12.6, a viscosity of about 60 centipoises and a pH of 6–8; and (2) 10 milliliters of technical chloral containing at least 96% chloral and a specific gravity of 1.5.

The chloral is added to the polyvinyl alcohol. An exothermic reaction takes place immediately and a milky color is developed. The reaction mixture thickens slightly and the viscosity increases. There is colloidal turbidity but no precipitate. The sharp, acrid, pungent odor of the chloral substantially disappears and is replaced by a different, distinctive odor which is similar to that of a chlorinated solvent. The temperature is observed to be about 60° C.

The reaction mixture is then neutralized to a pH of 6 with ammonium hydroxide and is cast as a film on a glass surface. The cast film is dried at a temperature of about 115° C. The polyvinyl choral film is brittle, water-insoluble and high-humidity resistant and is flame-retardant.

*Example II*

A second reaction mixture is prepared substantially as described in Example I and is used to impregnate a web having a weight of 400 grains per square yard and comprising rayon fibers having a denier of 1½ and a staple length of about 1 9/16 inches. The impregnated web is dried at a temperature of about 115° C. The resulting bonded product is a white, boardy, noisy nonwoven fabric with excellent wet strength and improved flame-retardant properties.

*Example III*

Fifteen milliliters of technical chloral (21.6 grams) is added to 20 milliliters of 4% aqueous polyvinyl alcohol (8 grams PVA). A milky color develops immediately and the reaction is slightly exothermic. The distinctive odor of chloral is replaced by a new, halogenated-solvent-like odor.

The reaction mixture is used as an adhesive to bond two "Mylar" polyethylene terephthalate films. The films are approximately 5 mils thick and are joined in a 1-inch wide lap joint. The laminated films are ironed to dryness at a temperature of about 350° F. The tear strength of the bond is tested by pulling the ends of the two films. The tear strength is very good; the resistance to delamination is fair.

*Example IV*

The procedures of Example III are carried out substantially as set forth therein with the exception that the "Mylar" films are only 1 mil thick. The lap joint is ironed to dryness at a temperature of about 400° F. The tear strength of the bond between the two films is very good and the resistance to delamination is good.

Example V

Carded fibrous webs weighing 300 grains per square yard and consisting of viscose rayon fibers having a staple length of 1 9/16 inches and a denier of 1½ are very lightly prebonded with polyvinyl alcohol and then impregnated with the following solutions:

| Sample | Ml. 4% Aqueous Polyvinyl Alcohol | Ml. Technical Chloral (96%) |
|---|---|---|
| 1 | 200 | 5 |
| 2 | 200 | 10 |
| 3 | 200 | 20 |
| 4 | 200 | 30 |
| 5 | 200 | 40 |

The impregnated webs are mangled, and dried at 100–120° C. The final samples have a pure white color. They are tested in triplicate for wet breaking load in cross direction. The results are as follows.

Sample: Test results
- Control (no treatment) _____ 0.0
- 1 _____ 0.1
- 2 _____ 0.7
- 3 _____ 1.0
- 4 _____ 0.8
- 5 _____ 1.1

The improvement in water resistance and wet strength is considered excellent.

Example VI

Carded fibrous webs weighing 600 grains per square yard and comprising 90% by weight of crimped "Dacron" polyethylene terephthalate fibers having a staple length of 1½ inches and a denier of 3, and 10% by weight of nylon 66 polyamide fibers having a staple length of 1½ inches and a denier of 3 are impregnated with the following solutions:

| Sample | Ml. 4% Aqueous Polyvinyl Alcohol | Ml. Technical Chloral (96%) |
|---|---|---|
| 1 | 200 | 5 |
| 2 | 200 | 10 |
| 3 | 200 | 15 |
| 4 | 200 | 20 |
| 5 | 200 | 25 |
| 6 | 200 | 50 |
| 7 | 200 | 100 |

The impregnated webs are mangled and dried at 110–120° C. The final samples have a good white color. They are measured wet in triplicate for breaking load in the cross direction. The results are as follows.

Sample: Test results
- Control (no treatment) _____ 0.0
- 1 _____ 0.3
- 2 _____ 1.4
- 3 _____ 1.9
- 4 _____ 2.3
- 5 _____ 2.2
- 6 _____ 2.9
- 7 _____ 3.3

The improvement in water resistance and wet strength is considered exceptional.

The increase in the breaking load of the "Dacron"-nylon web is to be compared to the lesser increase in breaking load of the viscose rayon web. It is believed that the chloral exerts a solvent action on the synthetic fibers whereby an autogenic bonding effect is realized in addition to the bonding and strengthening effect of the polyvinyl chloral. This so-called "double-barreled" effect is not realized on viscose rayon fibers which are not affected substantially by the chloral. It is to be noted, however, that the double-barreled effect is obtained only in the presence of free, uncombined chloral or chloral hydrate which condition prevails only when the chloral is present in greater than stoichiometric amounts.

It is also to be noted that both fabrics begin to develop wet strength at the same abscissa on the breaking load curves, i.e., at about 3% by weight of chloral. This verifies the significance of a polyvinyl alcohol-chloral cross-linking mechanism.

Although several specific examples of the inventive concept have been described, the same should not be construed as limited thereby nor to the specific substances mentioned therein but to include various other compounds of equivalent constitution as set forth in the claims appended hereto. It is understood that any suitable changes, modifications and variations may be made without departing from the spirit and scope of the invention.

What is claimed is:

1. A method of autogenically bonding a fibrous structure containing synthetic fibers capable of being rendered tacky by contact with chloral and simultaneously improving the water-resistant properties of said fibrous structure which comprises treating said fibrous structure with an aqueous reaction mixture of chloral and polyvinyl alcohol in which the chloral is present in an amount greater than its stoichiometric relation to the polyvinyl alcohol and drying the fibrous structure whereby the synthetic fibers are autogenically bonded to adjacent contacting fibers and the water-resistant properties of the fibrous structure are improved.

2. A method as defined in claim 1 wherein the polyvinyl alcohol has a percent hydrolysis of at least about 73 and a saponification number of less than about 273.5.

3. A method as defined in claim 1 wherein the polyvinyl alcohol has a percent hydrolysis of at least about 87 and a saponification number of less than about 147.3.

4. A method as defined in claim 1 wherein the proportions by weight of chloral to polyvinyl alcohol in the aqueous reaction mixture are greater than about 1.68 to 1 and up to about 5 to 1.

5. A method of autogenically bonding a fibrous structure containing synthetic fibers selected from the group consisting of polyester fibers, polyamide fibers, vinyl fibers and cellulose ester fibers, and simultaneously improving the water-resistant properties of said fibrous structure which comprises treating said fibrous structure with an aqueous reaction mixture of chloral and polyvinyl alcohol in which the chloral is present in an amount greater than its stoichiometric relation to the polyvinyl alcohol and drying the fibrous structure whereby the synthetic fibers are autogenically bonded to adjacent contacting fibers and the water-resistant properties of the fibrous structure are improved.

6. The product produced by the process of claim 5.

References Cited in the file of this patent

UNITED STATES PATENTS

| | | |
|---|---|---|
| 2,252,999 | Wallach et al. | Aug. 19, 1941 |
| 2,277,083 | Dorough | Mar. 24, 1942 |
| 2,326,048 | McNally et al. | Aug. 3, 1943 |
| 2,357,392 | Francis | Sept. 5, 1944 |
| 2,961,343 | Atwell | Nov. 22, 1960 |